United States Patent [19]

McMurray

[11] Patent Number: 4,600,210
[45] Date of Patent: Jul. 15, 1986

[54] TANDEM TRAILER DOLLY

[76] Inventor: Wade G. McMurray, 1504 Pineola Ave., Kingsport, Tenn. 37664

[21] Appl. No.: 734,333

[22] Filed: May 14, 1985

[51] Int. Cl.⁴ ............................................. B62D 53/08
[52] U.S. Cl. .................... 280/408; 280/411 C; 280/423 A; 280/425 R; 280/475; 280/476 R; 280/515
[58] Field of Search ............... 280/411 R, 411 C, 408, 280/405 R, 423 A, 425 R, 460 R, 475, 476 R, 492, 515, 508

[56] References Cited

U.S. PATENT DOCUMENTS

| D. 233,322 | 10/1974 | Schantz | D12/97 |
|---|---|---|---|
| 1,939,463 | 12/1933 | Rockinger | 280/508 |
| 2,133,202 | 10/1938 | Lantz | 280/492 |
| 2,400,522 | 5/1946 | Lantz | 280/492 |
| 3,421,777 | 1/1969 | Barker et al. | 280/408 |
| 3,612,575 | 10/1971 | Stewart | 280/474 |
| 3,717,363 | 2/1973 | Berends | 280/476 R |
| 3,827,723 | 8/1974 | Neff et al. | 280/476 R |
| 3,836,179 | 9/1974 | Jennings | 280/423 A X |
| 3,912,302 | 10/1975 | Patterson | 280/477 |
| 4,162,082 | 7/1979 | Curry | 280/423 R |
| 4,162,798 | 7/1979 | Foley | 280/475 |
| 4,400,004 | 8/1983 | Arguin | 280/408 |
| 4,444,409 | 4/1984 | Garrison | 280/492 |
| 4,451,058 | 5/1984 | Curry | 280/423 A |

FOREIGN PATENT DOCUMENTS

| 1098929 | 4/1981 | Canada | 280/408 |
|---|---|---|---|
| 1914348 | 3/1980 | Fed. Rep. of Germany | 280/515 |
| 645022 | 3/1964 | France | 280/491 A |
| 376840 | 11/1939 | Italy | 280/408 |

*Primary Examiner*—John J. Love
*Assistant Examiner*—Charles R. Watts
*Attorney, Agent, or Firm*—Wenderoth, Lind & Ponack

[57] ABSTRACT

A dolly for connecting two trailers in tandem comprises an axle, wheels rotatably mounted thereon, a fifth wheel secured to the axle, two towing eye hooks spaced apart from each other for connecting the dolly to the rear of the lead trailer so that controlled backing up of the entire tractor trailer rig is facilitated, and a sleeve swivelable about a tongue in such a manner so that the dolly may be hooked to the rear of the lead trailer on uneven ground and further so that side drag or "scooting" of the rear wheels on the lead trailer is avoided.

5 Claims, 8 Drawing Figures

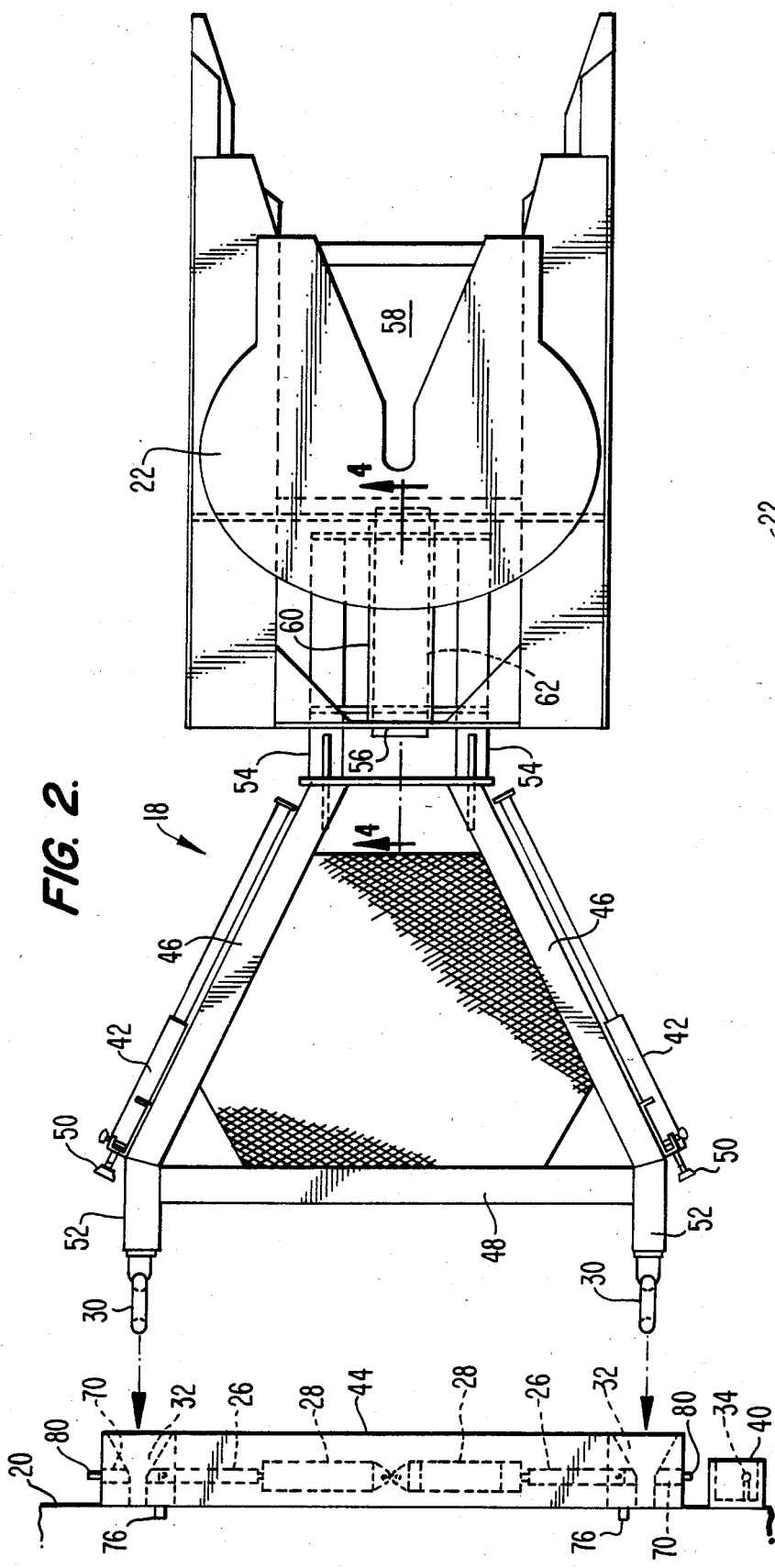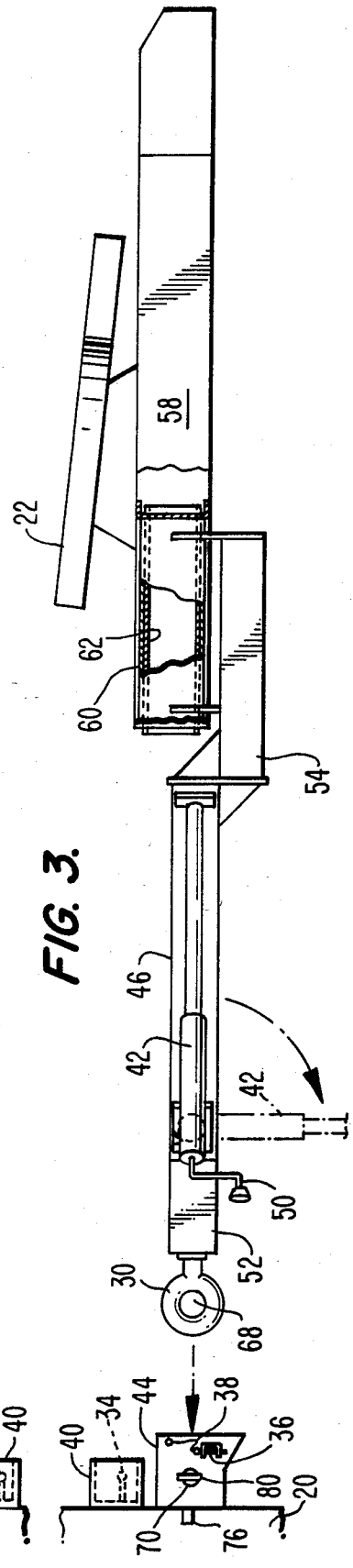

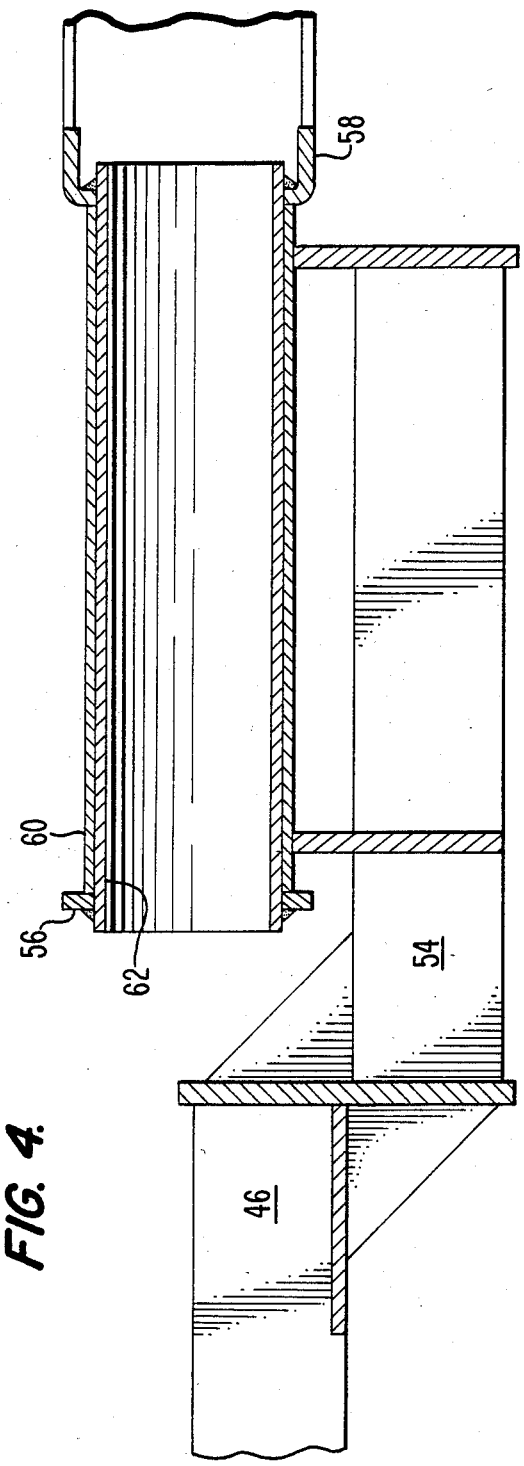
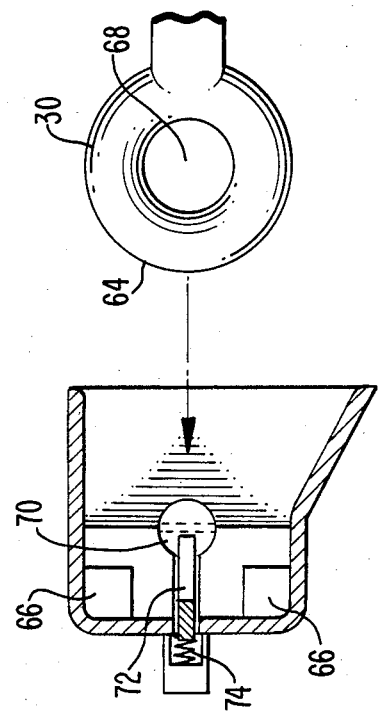
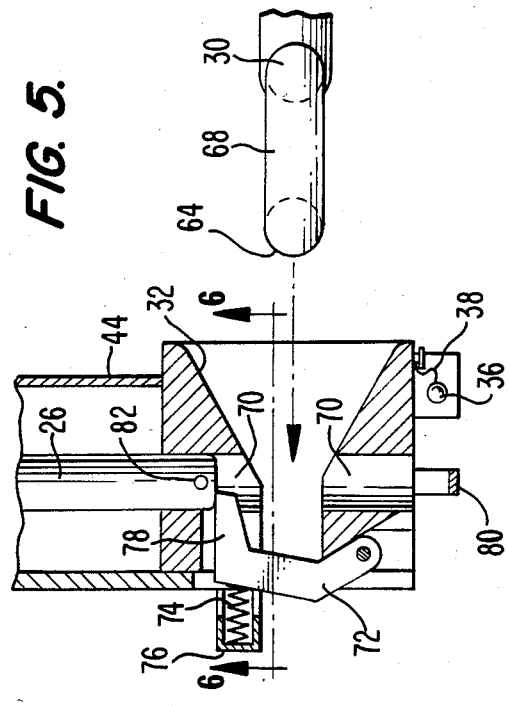

TANDEM TRAILER DOLLY

BACKGROUND OF THE INVENTION

1. Field of the Invention

This invention relates to a dolly for connecting a second trailer to a lead trailer.

2. Description of the Prior Art

Heretofore, a tandem trailer dolly has typically comprised an axle, wheels rotatable thereon, a fifth wheel secured to the axle, and one or two points for connecting the dolly to the rear of the lead trailer.

If only one point for connecting the dolly to the rear of the lead trailer is used, the structural arrangement of the known prior art devices render it practically impossible to control backing up of a tractor with tandem trailers attached thereto. Such exemplary prior art devices are shown in U.S. Pat. No. 3,717,363 to Berends, U.S. Pat. No. 3,827,723 to Neff et al., and U.S. Pat. No. 3,912,302 to Patterson.

However, such controlled backing up of the entire rig is facilitated by those prior art dollies which have two points spaced apart for connecting the dolly to the rear of the lead trailer. Such exemplary prior art devices are shown in U.S. Pat. No. De. 233,322 to Schantz, U.S. Pat. No. 3,421,777 to Barker et al., U.S. Pat. No. 3,612,575 to Stewart, U.S. Pat. No. 4,162,082 to Curry, U.S. Pat. No. 4,400,004 to Arguin, and U.S. Pat. No. 4,451,058 to Curry. Nevertheless, none of the prior art devices disclosed in these patents allows the second trailer to be hooked to the rear of the lead trailer on uneven ground. Also, the rigidity of the two separate points connecting the dolly at the rear of the lead trailer tend to cause the rear wheels of the lead trailer to drag sideways or "scoot" during moves through curves and turns.

SUMMARY OF THE INVENTION

A dolly for connecting two trailers in tandem comprises an axle, wheels rotatable thereon, a fifth wheel secured to the axle, two points spaced apart for connecting the dolly to the rear of the lead trailer so that controlled backing up of the entire rig is facilitated, and a sleeve swivelable about a tongue so that the second trailer may be hooked up to the rear of the lead trailer on uneven ground. Another advantage of the tongue-in-sleeve arrangement is that some flexibility is allowed during travel on the road since the rear wheels of the lead trailer move more readily through curves and turns, thus avoiding rear wheel side drag commonly known as "scooting."

These and other advantages of the present invention will be more fully understood from the following description of the drawings and the preferred embodiment.

BRIEF DESCRIPTION OF THE DRAWINGS

FIG. 2 shows a top plan view of the dolly, with wheels omitted for sake of simplicity, ready to be connected to a cross member channel on the rear of the first trailer.

FIG. 3 shows a side elevational view of the dolly illustrated in FIG. 2.

FIG. 4 shows a sleeve swivelable about a tongue in an enlarged cross-sectional side view taken along line 4—4 in FIG. 2.

FIG. 5 shows an enlarged cross-sectional top plan view of a latching mechanism on the cross member channel at the rear of the front trailer.

FIG. 6 shows the latching mechanism in a cross-sectional side view taken along line 6—6 in FIG. 5.

DETAILED DESCRIPTION OF THE PREFERRED EMBODIMENT

Figure 1:
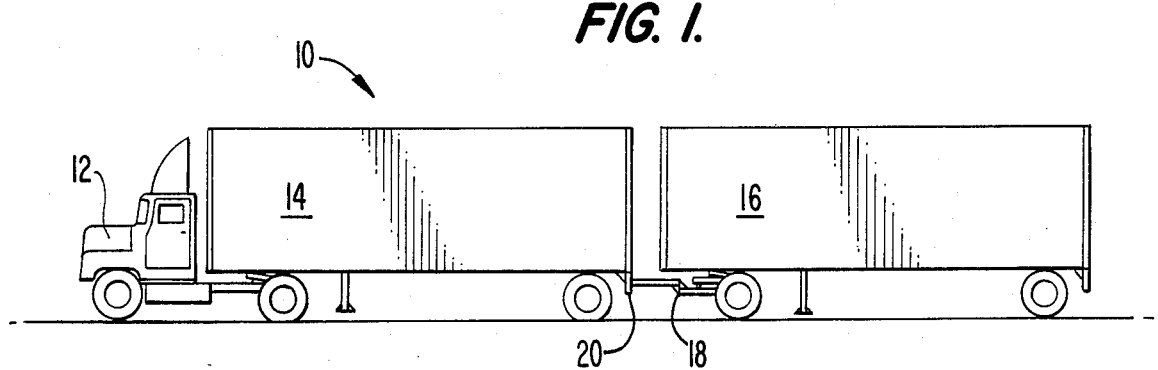
FIG. 1 shows a tractor hitched to the front of a first trailer and the dolly of the present invention connecting the front of a second trailer to the rear of the first trailer.

In FIG. 1, there is shown a rig 10 comprising a tractor 12, a first or lead trailer 14, and a second or rear trailer 16. A dolly 18 connects the front of the second trailer 16 to the rear 20 of the lead trailer 14.

As shown in FIGS. 2 and 3, the dolly 18 has a fifth wheel 22 which engages a standard kingpin (not shown) under the front of the second trailer shown in FIG. 1. Two towing eyehooks 30 are spaced apart from each other and are guided into V-latches 32 arranged in a channel 44 welded or otherwise firmly secured to the frame at the rear 20 of the first trailer 14. The interaction of pins 26 and pneumatic cylinders 28 with the V-latches 32 will be discussed in greater detail in reference to FIG. 5 hereinbelow. The pneumatic cylinders 28 are operated by a lever 34 in a control box 40 which is shown in one optional position above and separate from the channel 44 which extends continuously across the rear 20 of the first trailer 14. A safety pin 36 on a chain 38 is attached to a side of the channel 44.

Jacks 42, also shown in FIGS. 2 and 3, are attached to arms 46 of an A-frame 48 in a non-use or traveling position. By swinging the jacks 42 downwardly as shown by the phantom lines in FIG. 3 and by turning hand cranks 50, the jacks may be brought into a usable position when the dolly is not traveling. This aspect of the present invention is discussed later in relating to FIG. 7.

Still referring to FIGS. 2 and 3, the A-frame 48 has at one end short legs 52 on which the towing eye hooks 30 are secured. At the other end, as best shown in FIG. 4, the arms 46 converge to an apex with parallel bars 54 between which is mounted an outside sleeve 60 that may swivel about an inside tongue 62. The outside sleeve 60 is prevented from slipping off the inside tongue 62 by a stop 56. Returning to FIG. 2, it may be visualized that the maximum angle of tilt or angular rotation occurs when either one of the parallel bars 54 swivels up or rotates into contact with the stop 56.

As shown in FIG. 4, the inside tongue 62 is secured by welds to the dolly body 58. Thus, the outside sleeve 60 is confined against longitudinal movement by stops 56 at one end and by the dolly body 58 at the other end and is limited to rotational movement about the inside tongue 62.

By reference to the top view in FIG. 5 and the side view in FIG. 6, the securement of the towing eye hooks 30 in the V-latches 32 will now be explained. As shown in FIG. 6, the eye hooks 30 are guided by the operator into the V-latches 32 until the outer circumference 64 of each eye hook 30 is stopped by blocks 66. Referring to FIG. 5, the eye 68 of each hook 30 aligns with the channels 70 in which the pin 26 travels. While each hook 30 moves into each V-latch 32, the outer circumference 64 of each hook 30 first contacts a lock 72 which is in a position preventing the pin 26 from fully entering the channels 70. As the outer circumference 64 of each hook 30 pushes farther to the left in FIGS. 5 and 6 against the lock 72, a spring 74 engaging with the lock 72 is depressed in a box 76. When the end 78 of the lock 72 slips far enough to the left past the pin 26, the coaxially aligned pneumatic cylinders 28 of FIG. 2 force the pin 26, as shown in FIG. 5, through the channels 70 and through the eye 68 of each hook 30 until the pin 26 is stopped by catch 80. Safety pin 36 is then slipped through hole 82 in the end of the pin 26 so that the pin 26 is prevented from being pulled back through channel 70 in the event of a failure or other loss of pressure in the system which supplies air to the pneumatic cylinders 28 while the rig 10 is traveling on the road.

Figure 7:
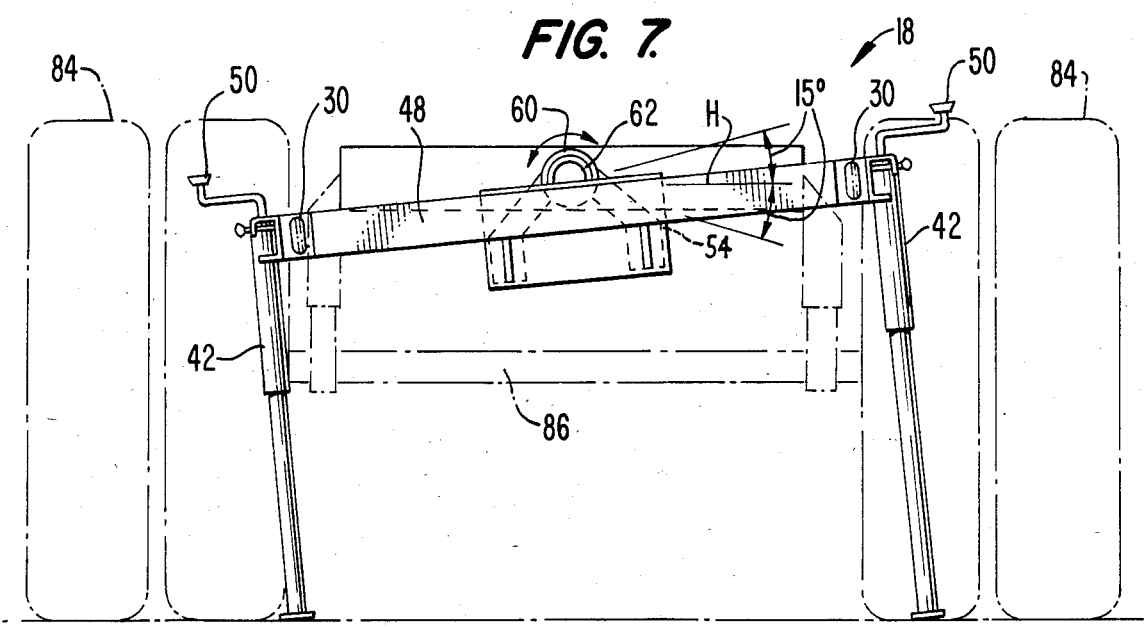
FIG. 7 shows a front elevational view of an A-frame of the dolly tilting at an angle while on a road surface. The approximate angle of tile shown in both the clockwise and the counterclockwise directions about an axis parallel to the wheel axis is indicated as about 15°.
Figure 8:
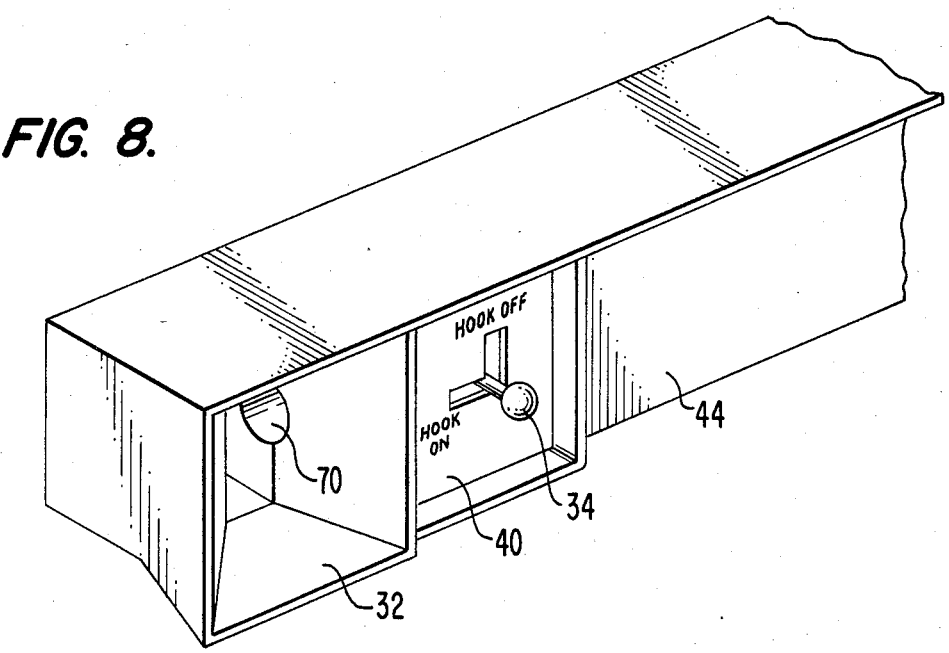
FIG. 8 is a perspective view of an alternate position for placement of a control box for operating pneumatic cylinders in the latching mechanism on the cross member channel at the rear of the first trailer.

As shown in FIG. 7, the dolly 18 comprises an axle 86 and wheels 84 rotatably mounted on the axle 86. The fifth wheel 22 is omitted for the sake of simplicity. Each hook 30 may be secured into a V-latch 32, such as shown in FIG. 8, even while either one or the other of the trailers 14 and 16 are on uneven ground. Returning to FIG. 7, such securement is accomplished simply by rotating the outside sleeve 60 relative to the stationary inside tongue 62 so that the entire A-frame 48 tilts to a desired angle. As shown the illustrative embodiment, the angle desired by the operator is ±15° from the horizontal plane H. It is desirable from a dynamic engineering standpoint to have the maximum possible angle not exceed 45° so that the second trailer 16 does not flip over completely in case excessive centrifugal forces are applied thereto when the rig 10 rounds a curve.

In attaching the dolly 18 to the rear 20 of the lead trailer 14 shown in FIG. 1, jacks 42, as seen in FIG. 7, may be adjusted according to the desired angle to help hold up the A-frame 48. This adjustment is done by turning the hand cranks 50 so that the jacks 42 are extended to the heights necessary to match the desired angle of tilt, thus stabilizing the positions of the eye hooks 30 relative to the ground. The maximum angle of tilt or angular rotation occurs when the parallel bars 54 swivel or rotate into contact with the stop 56 which is omitted from FIG. 7 for the sake of simplicity but which stop 56 is shown in FIGS. 2 and 4.

FIG. 8 shows an alternative placement for the control box 40 directly adjacent to the V-latch 32 on the continuous channel 44. The lever 34 is shown in a middle position between "hook on" and "hook off" positions for the air which feeds the pneumatic cylinders 28. In other words, the air must be "on" when the dolly is hooked up to the channel 44.

The operation of the invention will now be described in detail. First of all, as shown in FIG. 1, the driver hooks the tractor 12 to the front of the lead trailer 14 of the rig 10 in the conventional manner by backing the tractor 12 up into engagement with the front of the lead trailer 14. The driver then gets out of the tractor 12 and checks the rear 20 of the lead trailer 14 to move, as shown in FIG. 8, the lever 34 into the "hook on" position of the control box 40. This step causes air to flow into pneumatic cylinders 28 shown in FIG. 2. The driver then observes the evenness of the ground in front of the dolly 18 which has not yet been hooked up to the rear 20 of the lead trailer 14. Referring to FIG. 7, the driver manually grips and rotates the A-frame 48 so that the outside sleeve 60 turns and swivels around the inside tongue 62 to the desired angle of tilt. After setting down the jacks 42 to maintain the desired angle of tilt, the driver then climbs back into the cab of the tractor 12 and, as shown in FIG. 1, backs the lead trailer 14 into the dolly 18. Referring to FIGS. 2 and 3, as the lead trailer 14 is being backed into the dolly 18, the towing eye hooks 30 are aligned by slopes at the entrance of each V-latch 32. Referring to FIGS. 5 and 6, as each eye hook 30 approaches the back of each corresponding V-latch 32, the outer circumference 64 of each eye hook 30 contacts each lock 72 which depresses each spring 74 into each box 76 while simultaneously the end 78 of each lock 72 slips past the end of each pin 26. When the end 78 of each hook 72 passes the end of each pin 26, the pneumatic cylinders 28 of FIG. 2 push the pins 26, as shown in FIG. 5, so that each pin 26 immediately slides through the eye 68 of each eye hook 30 and out the channel 70 until stopped by the catch 80. Enough of each pin 26 is exposed outside of the V-latch 32 to enable the driver to get out of the tractor 12 and to insert the safety pin 36 on each chain 38 through the hole 82 in the end of each pin 26.

As shown in FIG. 2, the pneumatic cylinders 28 which drive the pins 26 are discussed as simultaneously operational. However, such pneumatic cylinders 28 may be operated independently of each other. The advantage of such an independent operation is that the driver is able to make the hook up shown in FIG. 1 when it is difficult for the driver to judge the unevenness of the ground. Thus, as shown in FIGS. 2 and 3, by aligning one eye hook 30 into a corresponding V-latch 32, the driver manually turns the A-frame 48 to the desired angle shown in FIG. 7 so that the other eye hook 30 is then also aligned with its corresponding V-latch 32.

As shown in FIG. 1, once the driver has backed up the tractor 12 and the lead trailer 14 enough for both eye hooks 30 on the dolly 18 to be latched to the rear 20 of the lead trailer 14 and the safety pins 36 are inserted into the ends of the pins 26 shown in FIG. 5, the driver turns the hand cranks 50 of FIGS. 2 and 7 to crank up the jacks 42. After being cranked up, the jacks 42 are rotated into their non-use or travel positions shown in FIGS. 2 and 3 on the arms 46 of the A-frame 48. This step completes the hook up of the dolly 18 to the rear 20 of the lead trailer 14.

At this point, by referring to FIG. 1, the second trailer 16 may be hooked up to the dolly 18 by backing up the tractor 12, lead trailer 14, and dolly 18 so that the fifth wheel 22, shown in FIGS. 2 and 3, on the dolly 18 engages with the kingpin (not shown) under the front of the second trailer 16 in the same conventional manner as the tractor 12 was hooked up to the front of the lead trailer 14. When the landing gears shown in FIG. 1 under the front of both trailers 14 and 16 are rolled up, the rig 10 is ready for inspection preparatory to a trip.

To unhook the dolly 18 from the rear 20 of the lead trailer 14, the driver carries out the following steps. First, the jacks 42 are rotated as shown in FIG. 3 and extended to the ground as shown in FIG. 7 by turning the hand cranks 50. Then referring to FIG. 5, the driver removes the safety pin 36 from each hole 82 in the protruding end of each pin 26. Referring to FIG. 8, the driver moves the lever 34 to the "hook off" position of the control box 40 on the channel 44. This step causes the air to be exhausted from the pneumatic cylinders 28 of FIG. 2, thus resulting in the retraction of the pins 26 from the channels 70 and the pulling of such pins 26 out of the eyes 68 of the eye hooks 30. As shown in FIG. 5, once each pin 26 is retracted back into the channel 44, the spring 74 in each box 76 forces the lock 72 forward into the channel 70 so that the path of the pin 26 through such channel 70 is again blocked. After visually inspecting each V-latch 32 as shown in FIG. 8 to be sure that each pin 26 has been completely retracted from the channel 70, the driver returns to the cab of the tractor 12 of FIG. 1 and pulls the lead trailer 14 away from the dolly 18.

The foregoing preferred embodiment is considered as illustrative only. Numerous other modifications and changes will readily occur to those persons skilled in the trucking art. Consequently, the disclosed invention is not limited to the exact construction and operation shown and described hereinabove.

I claim:

1. A dolly combination for connecting a rear end of a lead trailer pulled by a truck tractor in tandem with a second trailer, comprising:

an axle having two ends;

wheels rotatably mounted on the two ends of the axle;

a fifth wheel secured and centered above the axle;

a body for securing the fifth wheel to the axle and having a front end;

a tongue rigidly protruding from the front end of the body;

an A-frame converging toward the front end of the body and having front legs and a rear apex;

a sleeve being attached to the rear apex of the A-frame and being swivelable about the tongue to a desired angle;

at least two eye hooks spaced apart from each other and attached to the front legs of the A-frame;

stop means, connected to the front end of the body, for simultaneously preventing longitudinal movement of the sleeve and limiting angular rotation of the sleeve about the tongue;

whereby the dolly is easily hooked to the rear end of the lead trailer when on uneven ground and backing up of the lead trailer in tandem with the second trailer is controlled by the truck tractor because there are only two vertical articulation axes in the whole combination of the truck tractor, the lead trailer, the dolly, and the second trailer.

2. The dolly combination, according to claim 1, further comprising:

jack means, attached to the A-frame, for stabilizing the eye hooks relative to the uneven ground.

3. The dolly combination, according to claim 1, further comprising:

a continuous channel member extending across the rear end of the lead trailer.

4. The dolly combination, according to claim 3, further comprising:

at least two latch means, spaced apart from each other and attached to the channel member, for engaging with the at least two eye hooks;

pin means, arranged in the channel member, for passing into the eye hooks and the latch means; and means arranged coaxially behind the pin means in the channel member for driving the pin means through the eye hooks and the latch means.

5. The dolly combination, according to claim 4, further comprising:

catch means, attached to the latch means, for stopping the pin means from passing out of the latch means; and safety pin means, attached to the latch means, for preventing the pin means from passing back through the eye hooks.

* * * * *